(12) United States Patent
Hamar

(10) Patent No.: US 7,298,888 B2
(45) Date of Patent: Nov. 20, 2007

(54) ELECTRONIC LEVEL SENSOR

(75) Inventor: Martin R. Hamar, Wilton, CT (US)

(73) Assignee: Hamar Laser Instruments, Inc., Danbury, CT (US)

( * ) Notice: Subject to any disclaimer, the term of this patent is extended or adjusted under 35 U.S.C. 154(b) by 792 days.

(21) Appl. No.: 10/689,799

(22) Filed: Oct. 21, 2003

(65) Prior Publication Data

US 2004/0083616 A1 May 6, 2004

Related U.S. Application Data

(60) Provisional application No. 60/420,804, filed on Oct. 23, 2002.

(51) Int. Cl.
*G06K 9/00* (2006.01)

(52) U.S. Cl. .................................... 382/151

(58) Field of Classification Search ................ 382/151
See application file for complete search history.

(56) References Cited

U.S. PATENT DOCUMENTS

| | | |
|---|---|---|
| 2,252,727 A | 8/1941 | Pepper |
| 3,324,564 A | 6/1967 | Wright et al. |
| 4,382,680 A | 5/1983 | Hamar |
| 4,468,119 A | 8/1984 | Hamar |
| 4,566,202 A | 1/1986 | Hamar |
| 4,666,299 A | 5/1987 | Tamaki et al. |
| 4,714,344 A | 12/1987 | Hamar |
| 5,307,368 A | 4/1994 | Hamar |
| 5,317,810 A | 6/1994 | Isono et al. |
| 5,322,441 A | 6/1994 | Lewis et al. |
| 5,371,951 A | 12/1994 | Piske |
| 5,704,130 A * | 1/1998 | Augustin et al. ......... 33/366.12 |
| 6,115,928 A * | 9/2000 | Dauerer ....................... 33/348 |
| 6,248,989 B1 | 6/2001 | Ohishi |
| 6,320,653 B1 | 11/2001 | Feist |
| 6,343,422 B1 | 2/2002 | Takahashi |
| 6,410,932 B2 | 6/2002 | Johnson |
| 6,568,021 B1 * | 5/2003 | Wood ........................ 15/235.4 |
| 2003/0218469 A1 * | 11/2003 | Brazell et al. ............... 324/637 |

* cited by examiner

*Primary Examiner*—Vikkram Bali
(74) *Attorney, Agent, or Firm*—Gerald E. Hespos; Anthony J. Casella

(57) ABSTRACT

An electro-optical level includes a bubble level having a tube with a liquid therein and a bubble formed by the liquid in the tube. A substantially linear light source is directed toward and through the tube. A linear lens array focuses light passing through the bubble tube onto a linear lens array for producing an image of the bubble in the bubble level. The lens array employs the focused light to identify precisely end points of the bubble in the tube and then employs locational data for the end points to assess levelness. The electro-optical level further includes an out put display that is pivotally mounted into an optimal alignment for easy viewing by a user.

15 Claims, 4 Drawing Sheets

ELECTRONIC LEVEL SENSOR

This application claims priority on U.S. Provisional Patent Appl. No. 60/420,804, filed Oct. 23, 2002.

BACKGROUND OF THE INVENTION

1. Field of the Invention

The invention relates to a bubble level that employs electro-optical components for achieving high precision.

2. Description of the Related Art

A typical carpenter's level is an elongated generally rectangular structure having opposed first and second ends. Planar top and bottom faces are aligned parallel to one another and extend between the ends. The top and bottom faces are the portions of the prior art level that will be placed against another surface for assessing horizontal or vertical alignment.

A typical prior art level includes a glass tube partly filled with a liquid spirit. The portion of the tube that is not filled by the liquid forms a bubble. Movement of the level will cause the liquid to shift within the tube, and hence will cause a repositioning of the bubble. The tube includes a pair of lines that are spaced apart by a distance approximately equal to the length of the bubble. When the tube is aligned horizontally, the liquid will be disposed symmetrically in the tube, and the bubble will be positioned precisely between the lines.

The prior art level can be used by placing the top or bottom face of the level on a substantially horizontal surface. The relative position of the bubble in the tube provides an indication of the closeness of the level to a horizontal alignment. The surface on which the level is supported may be adjusted to position the bubble between the lines of the tube, and hence to achieve a fairly exact horizontal alignment of the surface on which the level is supported.

The precision that can be obtained with the prior art level is dependent upon the eyesight of the user and the ability of the user to determine the positions of the ends of the bubble relative to the lines on the glass tube. This ability will depend at least partly upon the optical alignment of the user of the level relative to the bubble tube. Precision can be fairly good if the user has good eyesight and if the user can be positioned so that the line of sight is perpendicular to the axis of the tube. However, the realities of a construction or manufacturing site often do not permit the user of a level to be positioned perfectly relative to the bubble tube. Thus, the level may be positioned at a location significantly above the head of the user or at a position where the line of sight is at an acute angle to the axis of the bubble tube. Either of these fairly common uses of a level significantly reduce accuracies that can be obtained by the level.

The boundary between the gas and the liquid in the bubble tube is fairly precise. However, the bubble is an elliptoid with curved boundaries. A viewer necessarily sees the curved boundaries between the gas and the liquid in the bubble tube, and hence the boundary between the bubble and the liquid appears as a fairly dark broad line. The apparent width of the line that defines the bubble can lead to a lack of precision by the user. In particular, accuracy will vary depending upon which part of the apparently broad boundary of the bubble aligns with the positioning indicia on the glass tube.

The prior art includes the use of electro-optical devices that attempt to determine the position of a bubble in a level. These devices have taken several forms, but rely primarily on attempts to identify an end or midpoint of the bubble or to identify an angle of the surface of the liquid. The known electro-optical devices used with a bubble level do not provide the desired degree of precision.

In view of the above, an object of the subject invention is to provide a bubble level with significantly increased accuracy.

Another object of the subject invention is to provide a bubble level where accuracy is not dependent upon the angle of viewing.

SUMMARY OF THE INVENTION

The subject invention is directed to a level that includes electronic and optical components for providing a high degree of accuracy independent of the angle of viewing and independent of the eyesight of the viewer.

The apparatus of the subject invention includes a bubble tube partly filled with a liquid so that a generally elliptoid bubble remains in the tube. The apparatus further includes a light source in proximity to the bubble tube and operative to direct light toward and through the bubble tube. The apparatus further includes a light sensor on a side of the bubble tube substantially diametrically opposite the light source and aligned for receiving light emitted from the light source and passing through the bubble. The light sensor is operative to generate electrical signals indicative of centers of energy impinging thereon. The apparatus also includes a focusing means between the bubble and the light sensor for focusing light passing through the bubble tube onto the sensor. The focusing means is operative to effectively image the bubble and adjacent areas of the bubble tube onto the sensor. The apparatus also may include a display for providing a clear visual indication of the output of the light sensor. The display may be a screen with a graph for identifying energy levels. Alternatively, the display may be a precise graphic depiction of a bubble tube. Still further, the display may provide a numerical quantification of the degree of levelness. The display may be mounted to the apparatus for pivoting or swiveling into an alignment that facilitates observation by a user. Thus, in contrast to prior art levels, accuracy and readability are entirely independent of the relevant positions of the level and the user.

The light source may comprise a substantially linear light source, such as a cold cathode illuminator, aligned parallel to the bubble tube.

The focusing means may include a lens array extending substantially linearly and parallel to the bubble tube. Alternatively, the focusing means may include a conventional cylindrical lens aligned substantially parallel to the axis of the bubble tube.

The light sensor may be a CCD array aligned substantially parallel to the bubble tube. The light sensor preferably is spaced approximately 1/16-1/8" from the focusing means.

In operation, the transmission of the light through the bubble tube will vary depending upon whether the light is being transmitted through the bubble or through the liquid and is significantly differently at the boundaries between the liquid and the bubble. In particular, light will be reflected or refracted differently by the bubble than by the liquid. These differences result in inverted peaks or "divots" in the output signals of the light sensor at locations substantially aligned with the ends of the bubble. The divots will be substantially identical and at known positions when the bubble is centered in the bubble tube. However, the divots will shift and/or change in size when the bubble moves in the tube.

The apparatus may be used with a differential screw adjusting means for moving the position of the level relative to the object that is being assessed. Hence, the differential screw adjuster may be moved until the light sensor and any output means associated therewith produce signals to indicate a level state for the level. Thus, amounts of adjustments can be measured.

The apparatus has several significant advantages over more complex electronic levels. In particular, the apparatus is very rugged and very compact. Furthermore, the apparatus can be packaged within a version of a conventional carpenter's level that is familiar to skilled technicians.

DETAILED DESCRIPTION OF THE PREFERRED EMBODIMENT

Figure 1:
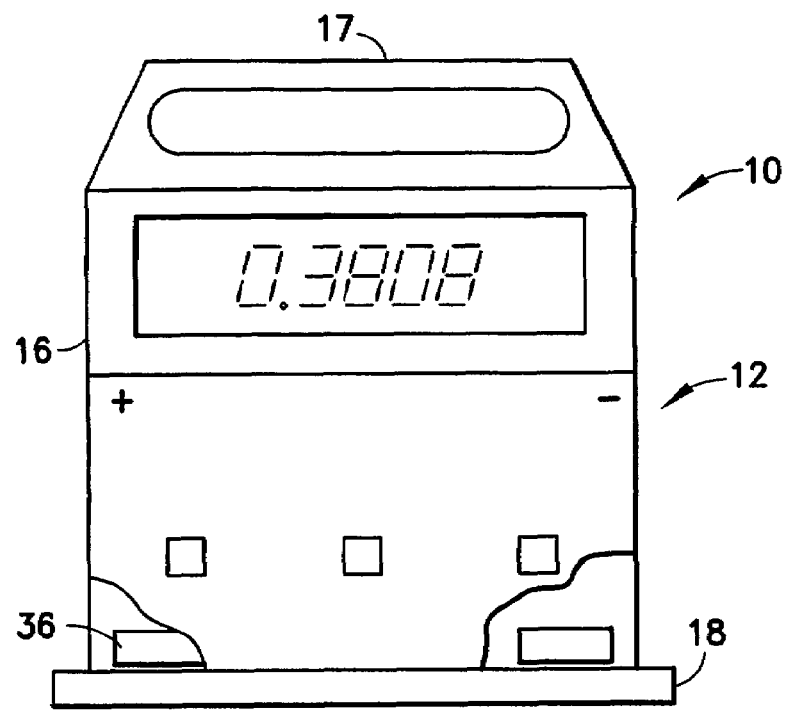
FIG. 1 is a front elevational view of a level apparatus in accordance with the subject invention.
Figure 2:
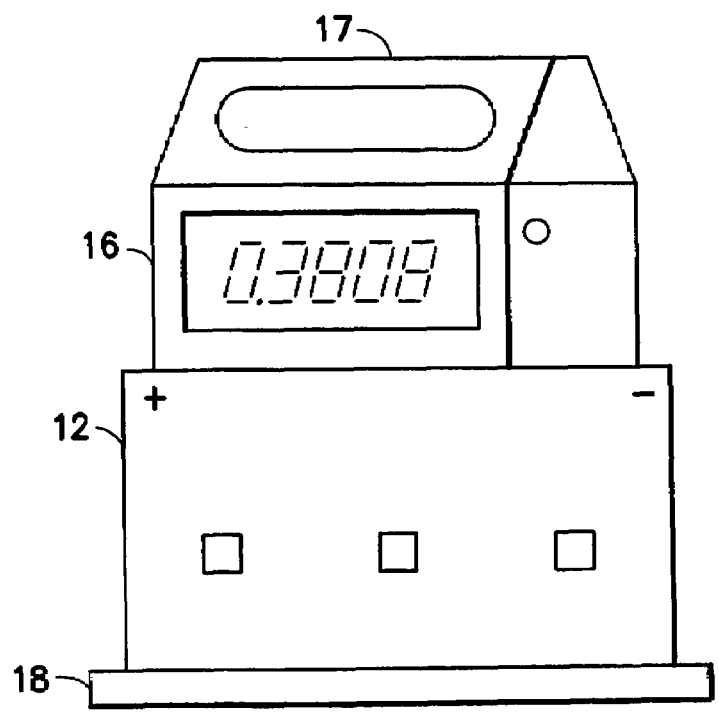
FIG. 2 is a front elevational view similar to FIG. 1, but showing the display in a different orientation.

A level apparatus in accordance with the subject invention is identified generally by the numeral 10 in FIGS. 1 and 2. The apparatus 10 includes an elongate rectangular housing 12, an electro-optical level sensor 14 (see FIG. 3) and an output display 16. The output display 16 is mounted pivotally to the housing 12 to achieve an optimum viewing angle for a user. The pivotal connection permits 360° of rotation of the display 16 relative to the housing 12. The display 16 incorporates a carrying handle 17 configured and dimensioned to be gripped by hand for carrying and positioning the apparatus 10. The apparatus 10 further includes a base 18 removably mounted to the housing 12 at a side substantially opposite the display 16. A plurality of differently configured bases 18 can be provided in accordance with the size and shape of the surface on which the apparatus 10 will be supported for measuring levelness.

Figure 3:
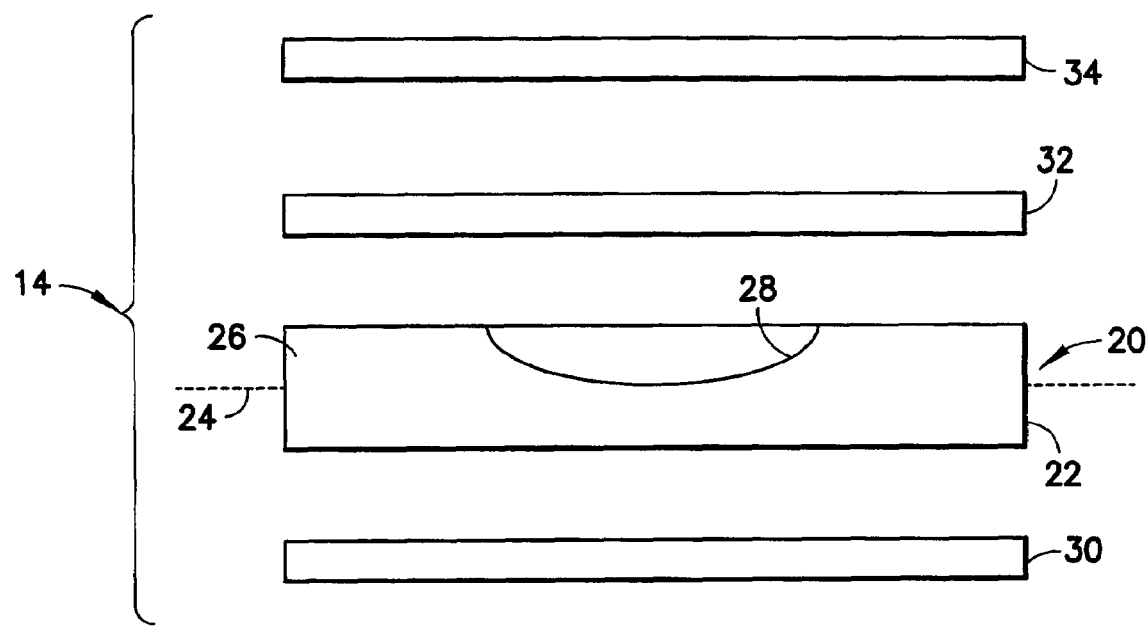
FIG. 3 is an exploded schematic view of the bubble level and the electronic and optical components used therewith.

The electro-optical level sensor 14 includes a bubble level 20 having an elongate tube 22 with a central axis 24, as shown in FIG. 3. The tube 22 may be curved convexly up or may be ground or otherwise formed to have an internal curve with a central high point, so that the interior of the level is generally barrel-shaped. The tube 22 is filled partly with a liquid 26, and portions of the tube 22 that are not filled with the liquid 26 define a bubble 28. The bubble 28 will move longitudinally within the tube 22 depending upon the orientation of the axis 24 relative to the gravitational axis. In particular, the bubble 28 will be centrally disposed in the tube 22 when the axis 24 of the tube 22 is normal to the gravitational axis. However, the bubble 28 will shift toward the high end of the tube 22 when the axis 24 of the tube 22 is not perpendicular to the gravitational axis. The amount of shifting of the bubble 28 will depend upon the angle between the axis 24 of the tube 22 and the gravitational axis.

The electro-optical level sensor 14 further includes a substantially linear light source 30 aligned substantially parallel to the axis 24 of the tube 22 and operative to emit light toward and through the tube 22. The light source 30 preferably is a cold cathode illuminator.

The electro-optical level sensor 14 illustrated in FIG. 3 further includes a lens 32 disposed on a side of the bubble level 20 opposite the light source 30. The lens 32 may be a cylindrical lens, a single spherical lens or a multiple lens array of cylindrical or spherical lenses arranged linearly, such as lens arrays sold under the trademark SELFOC® by NSG America, Inc. The lens array 32 focuses light that has been emitted from the light source 30 and passed through the tube 22 substantially along the axis of the tube.

The electro-optical level sensor 14 further includes a light sensitive receiver 34 aligned substantially parallel to the axis 24 of the tube 22 and disposed on a side of the lens array 32 opposite to the tube 22. Thus, the lens array 32 focuses an image of the liquid 26 and the bubble 28 onto the light sensitive receiver 34. The light sensitive receiver 34 may be a CCD array or other receiver that is operative to identify the location and magnitude of peaks of light energy impinging thereon. The light sensitive receiver 34 preferably defines a length in excess of the length of the bubble 28. However, the light receiver 34 need not extend the entire length of the tube 22. The light sensitive receiver 34 is connected operatively to a processor 36 that is in the housing 12 connected to the display 16. Thus, the display 16 is operative to produce an output indicative of energy peaks identified by the CCD array or other such light sensitive receiver 34. The apparatus 10 may further include an aperture plate between the tube 22 and the light sensitive receiver 34.

The liquid 26 and the bubble 28 in the tube 22 alter the level of energy of illumination passing through the tube 22 and focused by the lens array 32 onto the CCD array or other such light sensitive receiver 34. The variation in output voltage is measured by variations in voltage level outputted from the light sensitive receiver 34. The variation in illumination is most prominent at the edges of the bubble 28. Thus, the bubble 28 takes the uniform illumination produced by the light source 30 and focused by the lens 32 and couples energy from the position of the bubble 28 and beyond the ends of the bubble 28 to produce an energy distribution as shown in FIGS. 4 and 5.

Figure 4:
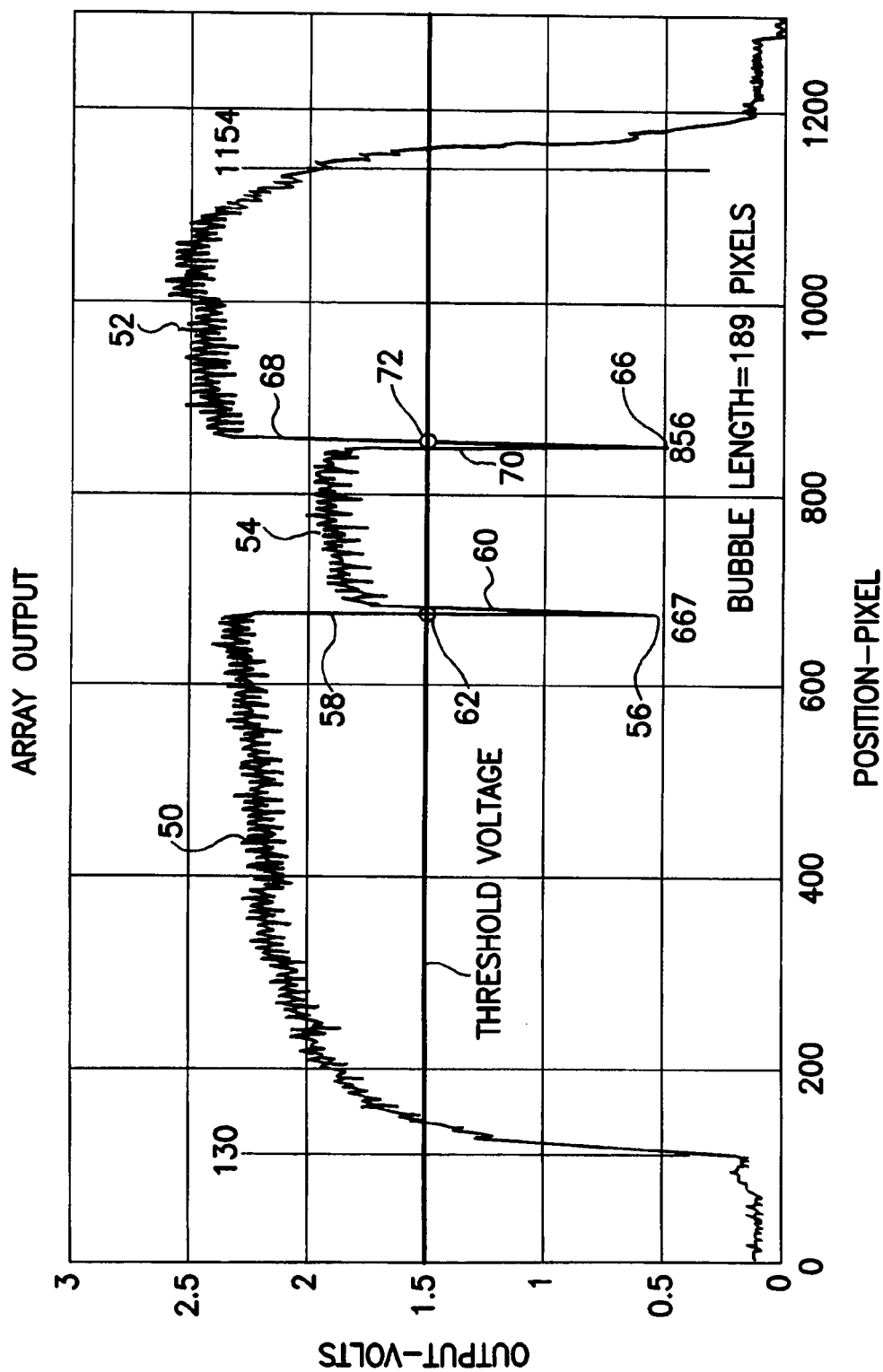
FIG. 4 is a schematic illustration of the output of the level apparatus.
Figure 5:
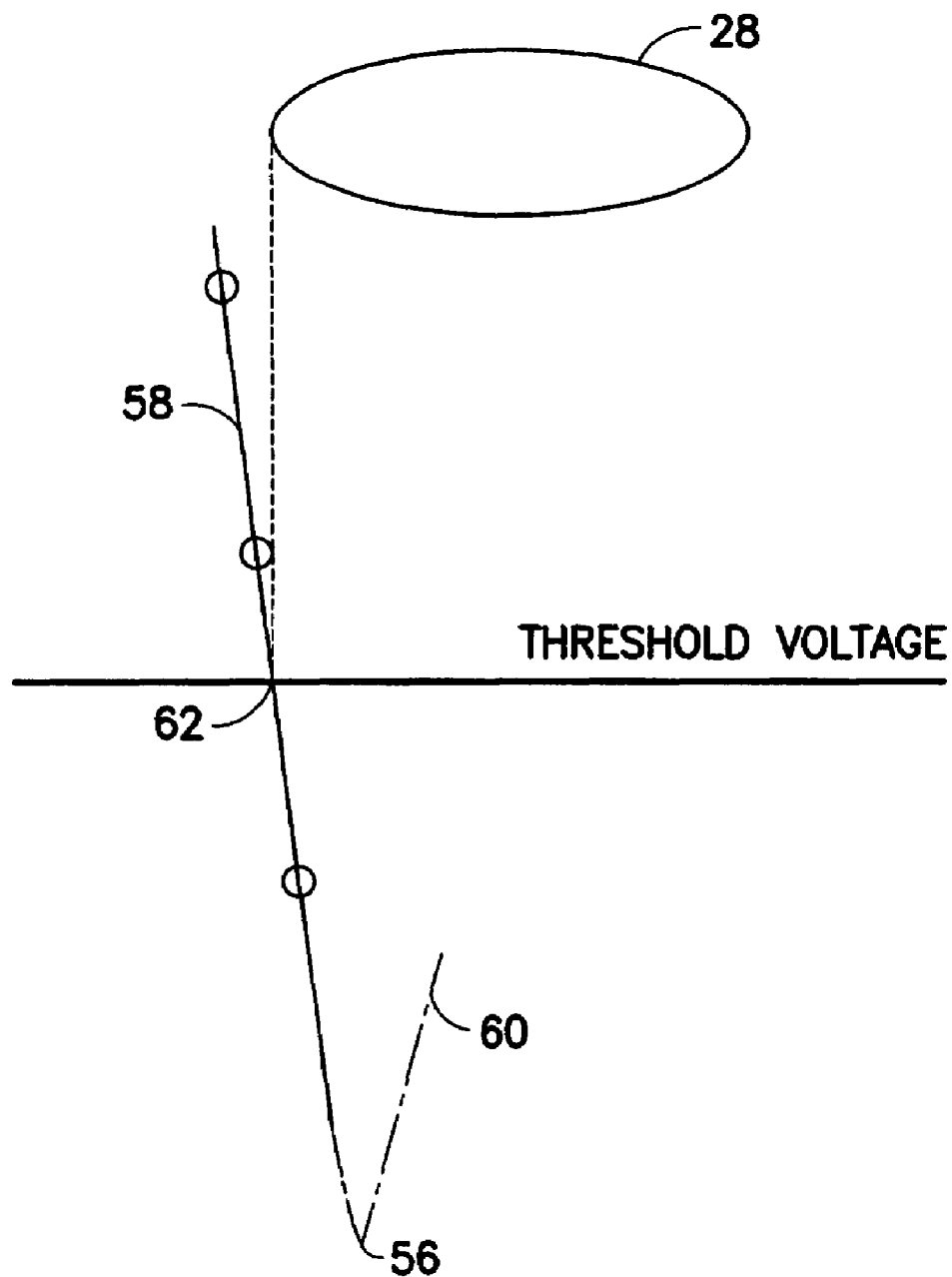
FIG. 5 is a graphic depiction of a portion of the readout for precisely identifying a position of an end of the bubble.

The energy distribution shown in FIG. 4 depicts two substantially equal inverse peaks or "divots" indicative of a bubble 28 that is centrally disposed relative to the light sensitive receiver 34 and hence indicating a horizontal alignment of the axis 24. The bubble 28 shifts to the left or right if the axis 24 is not perfectly horizontal. As a result, the divots also shift, and one of the divots may become larger and the other may become smaller in proportion. The divots are read by the CCD array 34 and associated electronics. More particularly, the input current is adjusted by the processor 36 to achieve a brightness or output voltage for each pixel of the CCD array 34 that is in a readable range. The output voltage of each pixel in the CCD array 34 then is read by the processor 36 of the electro-optical sensor 14. As shown in FIG. 4, the array output includes a first set of pixel output voltages 50 on a first side of the bubble 28, a second set of pixel output voltages 52 on a second side of the bubble 28 and an array of pixel output voltages 54 corresponding to the bubble 28. A divot 56 is defined between the first array of pixel output voltages 50 to the left of the bubble 28 and the array of pixel output voltages 54 aligned with the bubble. The divot 56 has a slope 58 extending from the first array of pixel output voltages 50 to the divot 56 and a slope 60 extending from the divot 56 to the array of pixel output voltages 54 corresponding to bubble 28. The slope 58 is longer and steeper than the slope 60. The array output further includes a divot 66 corresponding to the right end of the bubble 28. A slope 68 extends from the divot 66 to the array of pixel output voltages 52 and a slope 70 extending from the array of pixel output voltages 54 corresponding to the bubble 28 to the divot 66. The slope 68 is steeper and longer than the slope 70. The processor 36 of the apparatus 10 establishes a threshold voltage, as shown in FIG. 4, at a position that is known to intersect the slopes 58 and 68 approximately at their midpoint. The controller then identifies voltage levels for specific pixel positions on the respective slopes 58 and 68 and through a simple algebraic linear regression calculation identifies relative pixel positions 62 and 72 where the respective slopes 58 and 68 intersect the threshold voltage, as shown in FIG. 5. The positions 62 and 72 are symmetrically disposed with great precision relative to opposite ends of the bubble 28. Hence, the center of the bubble 28 can be defined with great precision as the midpoint between the respective threshold intersections 62 and 72 respectively. The longer steeper slopes 58 and 68 provide more precision.

FIG. 4 shows a bubble length of 189 pixels in this example. That bubble length will remain substantially constant for a broad array of angular orientations of the level 20 and can be determined during a calibration of the apparatus 10. As shown in FIG. 4, the divots 56 and 66 have nearly identical output levels. However, as the level 20 is tilted more, the optics associated with the bubble 28 will cause the output voltages of the respective peaks to vary significantly from one another. Within a range of angular alignments normally encountered, the above-described algorithm can be applied with great accuracy despite the different output voltage levels for the respective divots 56 and 66. However, at a certain angle for the level, one or the other of the divots 56 or 66 may move above the threshold voltage. Thus, the above described algebraic procedure cannot be used for identifying the two intersections 62 and 72 of the threshold voltage. However, one intersection 62 or 72 can be identified. Additionally, the bubble length will remain constant. As a result, the one intersection 62 or 72 for slope 58 or 68 with the threshold voltage can be used with the knowledge of the bubble length to identify the center of the bubble 28. Thus, in this situation, at least two and preferably three pixel readings along the slope 58 or 68 will be identified so that the readings bridge the threshold voltage. An algebraic linear regression equation is used to identify the precise intersection with the threshold voltage and one-half of the bubble length is added to or subtracted from pixel position for the intersection 62 or 72 of the threshold voltage to identify the precise pixel position for the center of the bubble 28 relative to the CCD array 34.

The apparatus 10 is used by placing the base 18 on a surface that is to be tested for levelness. The apparatus 10 then may be powered on by using a control switch 74 connected to an internal power source 76, such as a rechargeable lithium-ion battery. The display 16 is pivoted relative to the base 18 to be readily visually observable to a user. The bubble 28 will move in the tube 22 depending upon the alignment of the surface. The apparatus 10 functions by directing light from the light source 30 through the bubble level 20. The lens array 32 focuses the light onto the CCD array or other sensor 34, and hence produces an image of the bubble 28 on the CCD array 34. The processor 36 of the apparatus 10 then identifies at least one of the divots 56 and 66 corresponding to the ends of the bubble 28 and calculates the intersection 62 and/or 72 of at least one of the slopes 58 and 68. The pixel positions for the intersections of the slopes 58 and/or 68 with the threshold voltage are determined with great precision and the midpoint of the bubble 28 then is determined based on those calculated pixel positions. More particularly, the midpoint of the bubble 28 is midway between the threshold intersections 62 and 72 in those situations where both slopes 58 and 68 intersect the threshold voltage. Alternatively, the midpoint of the bubble 28 can be determined by adding a previously calibrated bubble length to the intersection 62 or 72 of the threshold voltage with one of the slopes 58 or 68. As noted above, the level 12 can be used with differential screw adjusters to alter the relative vertical position of either end of the level 12. Thus, the user can observe the changes in the peaks on the display 16 shown in FIGS. 1 and 2 as the differential screw adjusters are being turned. As a result, real-time adjustments and calibration can be carried out. The display 16 can output information on levelness in terms of arc seconds or distance (inches or millimeters) based on trigonometric calculations performed by the processor 36. The display 16 also can indicate whether the output data is positive or negative relative to the "+" and "−" indicia applied to the housing 12.

The level 20 is described herein as a bubble tube 22. However the level also can be a bulls eye level where the bubble can move relative to two axes to measure levelness in plural directions. With this embodiment, it is necessary to focus the image onto two perpendicularly arranged linear arrays of sensors or onto a two axis sensor.

What is claimed is:

1. An electro-optical level comprising:
    a bubble level having a liquid and a gas bubble therein;
    a light source in proximity to the bubble level for directing light toward and through the bubble level;
    a light sensor disposed on a side of the bubble level opposite the light source and operative for identifying characteristics of light impinging thereon;
    a lens disposed between the bubble level and the light sensor for focusing an image of the bubble onto the light sensor;
    a display for displaying output readings of said light sensor indicative of levelness; and
    a controller connected to the light sensor and the display, the controller being operative to identified display output data indicative of at least one end of the bubble.

2. The electro-optical level of claim 1, wherein the liquid and the bubble are disposed in a bubble tube, the light sensor comprises a CCD linear array aligned substantially parallel to the bubble tube and having a length exceeding a length of the bubble in the bubble tube.

3. The electro-optical level of claim 1, wherein the lens is an elongate lens aligned substantially parallel to the bubble level and wherein the light sensor is an elongate sensor aligned substantially parallel to the lens.

4. The electro-optical level of claim 3, wherein the lens is a cylindrical lens.

5. The electro-optical sensor of claim 3, wherein the lens is an elongate lens array comprising a plurality of lenses, the lens array being aligned substantially parallel to the bubble level.

6. The electro-optical level of claim 1, wherein the light source is a substantially linear light source aligned substantially parallel to the bubble level.

7. The electro-optical level of claim 6, wherein the light source is a cold cathode illuminator.

8. The electro-optical level of claim 1, further comprising a housing for enclosing and supporting the bubble level, the light source, the lens and the light sensor, the display being pivotally mounted to the housing for altering viewing angles of the display relative to the housing.

9. The electro-optical level of claim 8, further comprising a handle incorporated into the display for transporting the electro-optical level.

10. The electro-optical level of claim 8, wherein the housing has a base surface aligned substantially parallel to the bubble level for supporting the housing on an object to be tested for levelness.

11. The electro-optical level of claim 1, wherein the light sensor is operative to produce a plurality of output voltages at a corresponding plurality of locations along said light sensor, said controller being operative to identify output voltages indicative of at least one end of the bubble.

12. A method for assessing levelness of an object comprising:
  providing a bubble level having a bubble tube with a liquid therein and a bubble formed by the liquid in the bubble tube;
  placing said bubble tube in a position substantially parallel to a surface of the object;
  directing light through the bubble tube;
  focusing at least a portion of the light passed through the bubble tube;
  sensing characteristics of the focused light at a plurality of locations along the bubble tube;
  identifying characteristics sensed for the focused light by measuring output voltages produced by the focused light at each of the plurality locations parallel to the bubble tube and identifying at least one location having a significantly lower output voltage level than locations spaced therefrom for identifying at least one end of the bubble; and
  calculating a degree of levelness based on a location sensed for the end of the bubble.

13. The method of claim 12, wherein the step of identifying at least one end of the bubble comprises identifying positions for opposed ends of the bubble relative to a longitudinal axis of the bubble tube.

14. The method of claim 12, further comprising performing a calibrating step to determine a length of the bubble relative to a longitudinal axis of the bubble tube, and wherein the step of calculating a degree of levelness comprises comparing a location of a single end of the bubble with information calibrated for the length of the bubble.

15. The method of claim 12, further comprising the step of establishing a threshold voltage less than a maximum output voltage produced by the focused light and greater than the lower output voltage and identifying at least one location where said measured output voltage substantially equals said threshold voltage for determining location data corresponding to at least one end of the bubble.

* * * * *